US005277873A

United States Patent [19]

Hsei

[11] Patent Number: 5,277,873
[45] Date of Patent: Jan. 11, 1994

[54] SAMPLE PREPARATION DEVICE

[76] Inventor: Paul K. Hsei, 20491 Graystone La., Huntington Beach, Calif. 92646

[21] Appl. No.: 42,578

[22] Filed: Apr. 5, 1993

Related U.S. Application Data

[63] Continuation-in-part of Ser. No. 843,241, Feb. 28, 1992.

[51] Int. Cl.[5] ........................ E01C 3/00; G01N 9/30; G01N 35/00

[52] U.S. Cl. ........................ 422/102; 422/72; 422/103; 436/45; 494/16; 494/20; 494/31; 494/33; 494/44; 206/221; 220/8; 366/167; 366/208; 366/214

[58] Field of Search ........................ 206/221; 220/8; 366/167, 208, 214; 422/64, 72, 102, 103, 161; 436/45; 494/16, 20, 31, 33, 44

[56] References Cited

U.S. PATENT DOCUMENTS

| | | | |
|---|---|---|---|
| 4,123,224 | 10/1978 | Givner et al. | 422/72 X |
| 4,270,921 | 6/1981 | Graas | 422/72 X |
| 4,436,820 | 3/1984 | Reiter | 422/72 X |
| 4,792,432 | 12/1988 | Ikonen | 422/72 |
| 5,084,240 | 1/1992 | Babson | 422/72 |

*Primary Examiner*—James C. Housel
*Assistant Examiner*—Milton I. Cano
*Attorney, Agent, or Firm*—J. E. Brunton

[57] ABSTRACT

A sample preparation device for precisely measuring a sample volume, mixing the sample with a reagent and then separating out any resulting precipitant from the sample. In using the device, the sample is nonquantitatively dispensed by the user and is volumetrically delivered by the device using a positive displacement method. No vortexing or shaking is required and the sample and reagent are precisely and reproducibly mixed automatically.

10 Claims, 6 Drawing Sheets

SAMPLE PREPARATION DEVICE

This is a Continuation-In-Part of presently co-pending application, Ser. No. 07/843,241 filed Feb. 28,1992.

BACKGROUND OF THE INVENTION

1. Field of the Invention

The present invention relates generally to sample preparation devices. More particularly, the invention concerns a disposable sample preparation device which precisely measures a volume of sample, mixes it with prepackaged reagent, and then separates any resulting precipitant or particles from the sample.

2. Discussion of the Invention

There is a substantial need in chemical analysis to perform many different types of high volume colorimetric assays which require the addition of one or two reagents to a sample. These assays include: albumin, total protein, iron, phosphorous, and magnesium in serum, plasma, or urine. Adolase, amylase and acid phosphates are additional examples of enzymes which may be assayed in these body fluids. Each of these assays employs one or two stable reagents having a long shelf life.

Recently the National Institute of Health and the Center for Disease Control has identified serum high density lipoprotein (HDL) concentration as an important indicator for coronary heart disease. Public awareness of the importance of HDL, through the National Cholesterol Education Program and other media, has created a substantial demand for this test. Prior art methods available for serum HDL measurement require intricate sample preparation procedures and the cost and accuracy of HDL measurements rely heavily upon the skills of the individual charged with the execution of sample preparation. Therefore, a substantial need exists for a device which can reduce the reliance on labor intensive sample preparation techniques for HDL measurement.

A major thrust of the present invention is to provide a sample preparation device which overcomes prior art drawbacks of the character discussed in the preceding paragraph and to provide a simple and easy to use, yet highly accurate device, capable of accomplishing a number of different types of sample preparation tasks.

SUMMARY OF THE INVENTION

It is an object of the present invention to provide a novel sample preparation device for precisely measuring a sample volume, mixing the sample with a reagent and then, when necessary, separating out any resulting precipitant from the sample.

Another object of the invention is to provide a device of the aforementioned character which is of simple construction and one which can be used by technicians of ordinary skill.

Another object of the invention is to provide a device of the type described in which errors and imprecision arising from differences in individual technique will be reduced because the sample and reagent are precisely dispensed, mixed and separated by the device itself.

Another object of the invention is to provide a sample preparation device which will accommodate reagents prepackaged in unit doses. Such prepacked reagents may include polypeptides and polynuckotides immobilized on the surface of this invention.

Another object of the invention is to provide a device of the class described in which the sample is nonquantitatively dispensed by the user and is volumetrically delivered by the device using a positive displacement method.

Still another object of the invention is to provide a device of the character described in the preceding paragraphs in which no vortexing or shaking is required and in which the sample and reagent are precisely and reproducibly mixed automatically.

Yet another object of the invention is to provide a sample preparation device which can be inexpensively produced so that the device can be economically disposed of after the mixing operation.

Another object of the device is to allow spectrophotometric measurements to be made directly on the device thereby eliminating the need for a separate cuvette and a second sample transfer step.

DESCRIPTION OF THE INVENTION

Figure 1:
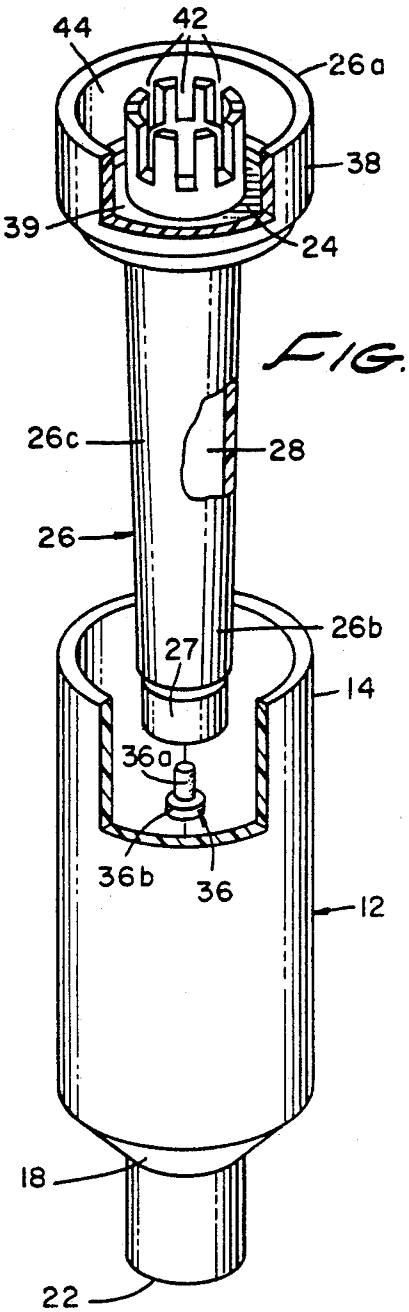
FIG. 1 is a generally perspective exploded view of one form of the sample preparation device of the invention partly broken away to show internal construction.
Figure 2:
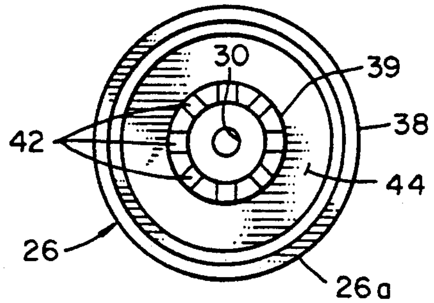
FIG. 2 is a top view of the form of the apparatus shown in FIG. 1.
Figure 3:
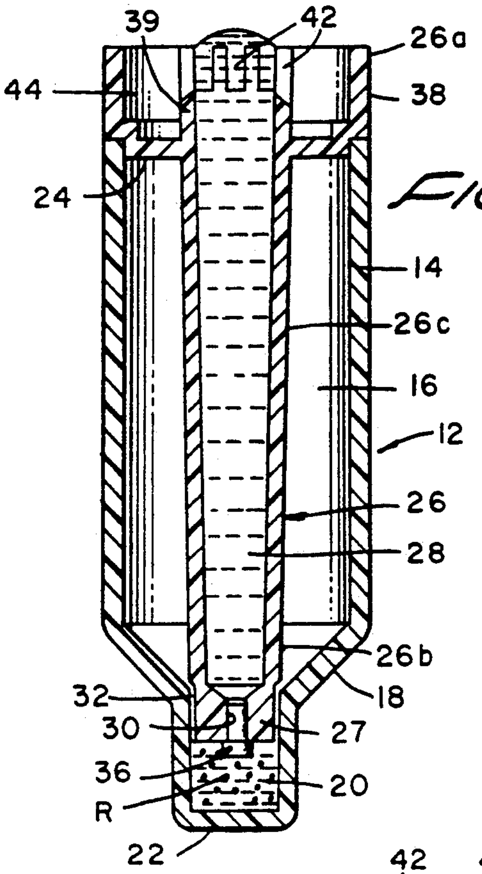
FIG. 3 is a cross-sectional view of the device showing the sample in one chamber of the device and the reagent to be mixed with the sample in another chamber of the device.

Referring to the drawings and particularly to FIGS. 1, 2 and 3, the sample preparation device of one form of the invention is there illustrated. In this form of the invention, the device comprises a first outer container 12 having upper generally cylindrically shaped outer walls 14 defining a first, or intermixing chamber 16. Container 12 includes walls 18 which define a frustoconical section that interconnects upper or first chamber 16 with a second, or reagent chamber 20. A bottom wall 22 closes lower reagent chamber 20 and an upper wall 24, of a character presently to be described closes upper chamber 16.

Figure 5:
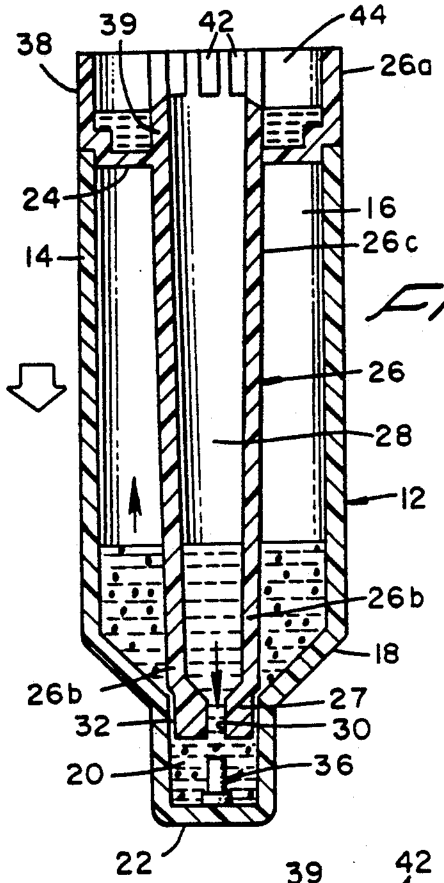
FIG. 5 is a cross-sectional view similar to FIG. 4 but illustrating the initial mixing step during the second centrifuge wherein the sample and reagent are intermixed.

The device of the invention also includes a second container 26 which comprises a first or upper portion 26*a*, a second or lower portion 26*b* and an intermediate portion 26*c*. Second container 26 includes an internal sample chamber 28 which is open at its upper end 26*a* and closed at its lower end by a wall 27. As is best seen in FIG. 5, wall 27 is provided with an axially extending first passageway 30. As indicated in FIG. 5, second portion 26*b* of second container 26 is receivable within the upper portion of chamber 20 of the first container. When second container 26 is so positioned within the first container, axial passageway 30 can functions to permit fluid communication between internal sample chamber 28 of the second container and lower or reagent chamber 20 of the first container. In like manner, when second container 26 is correctly positioned within the first container, there is defined an annular passageway 32 which permits fluid communication between lower chamber 20 (FIG. 3) and intermixing chamber 16 of first container 12.

Turning once again to FIG. 3, it is to be noted that passageway 30 is initially closed by a sealing means shown here as an elastomeric member 36. Member 36 can be any configuration such as a ball or a rapturable diaphragm or membrane, but is shown here as a plug having a shank portion 36*a* and an enlarged diameter head portion 36*b*. Shank portion 36*a* is closely receivable within bore 30 and functions to normally block fluid communication between internal chamber 28 of the second container and lower chamber 20 of the first container.

The upper portion 26*a* of second container 26 includes an enlarged diameter portion 38 which is generally cylindrical in shape and has outer walls which terminate in the previously mentioned partition wall 24 which functions to close the upper end of chamber 16. Enlarged diameter portion 38 circumscribes an upper generally cylindrically shaped portion 39 of second container 26. As best seen in FIGS. 1 and 2, portion 39 is provided with a plurality of circumferential spaced slots 42 which permit fluid communication between chamber 28 of container 26 and an overflow chamber 44 defined internally of cylindrical portion 38 of the second container 26. It is to be understood that a fluid passageway other than slots 42 can be provided such as holes or a single slot in portion 39. The purpose of this overflow chamber 44 will presently be discussed.

Figure 4:
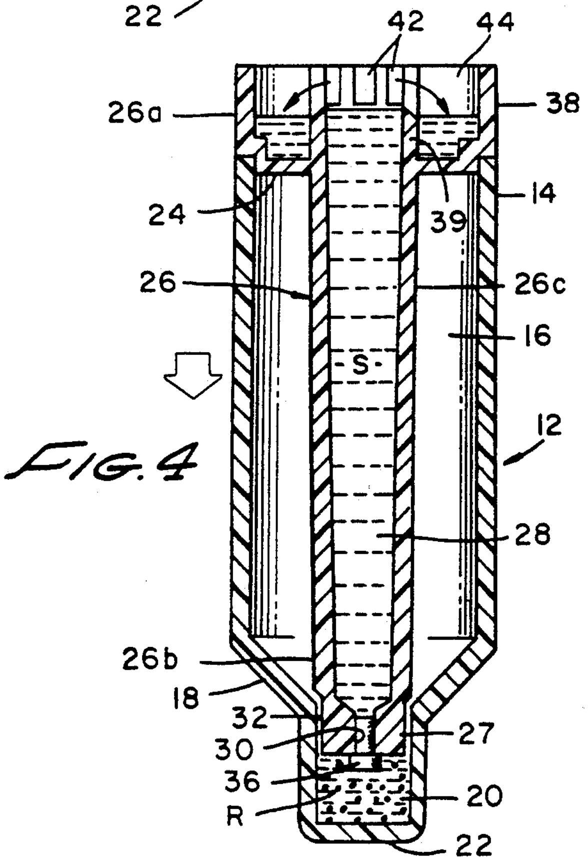
FIG. 4 is a cross-sectional view similar to FIG. 3 but showing the overflow of the sample into an overflow chamber upon execution of the first centrifuge.

Referring now to FIG. 3, chamber 20 of the device contains a precisely measured volume of a selected reagent R. With the sealing means or plug 36 in place as shown in FIG. 3, chamber 20 is effectively sealed from chamber. With the plug 36 in place, chamber 28 is filled to overflowing with the selected sample S which is to be processed. The device is then placed in a centrifuge and initially spun for a very short time at a moderate rate. During this initial centrifuge period, some of the sample S will flow through slots 42 and into the overflow chamber 44 in the manner illustrated in FIG. 4. This results in a precise volumetric amount of the sample S remaining within chamber 28.

Figure 6:
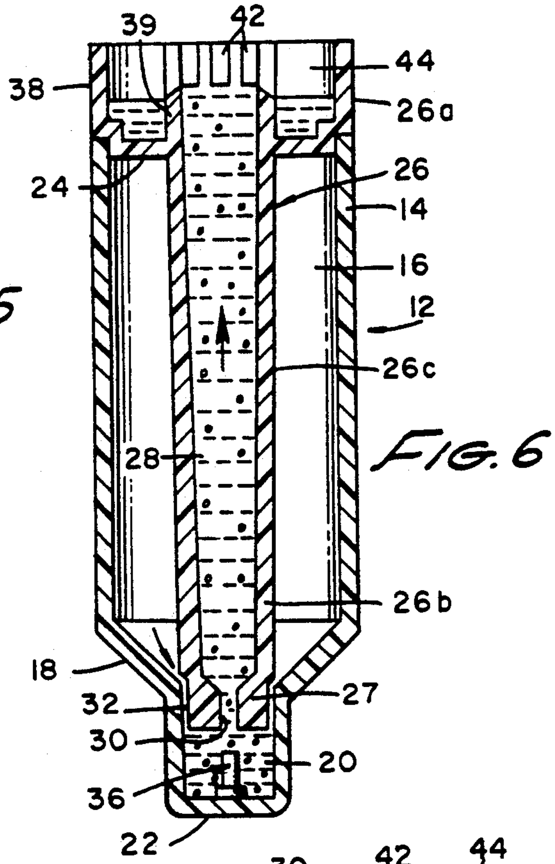
FIG. 6 is a cross-sectional view similar to FIG. 5 illustrating the return flow of the intermixed fluids into the first and second chambers.

As the centrifuge continues to accelerate, the force continues to increase until a point is reached where the sealing means or plug 36 is forced out of sealing engagement with passageway 30 and into chamber 20 in the manner shown in FIG. 5. This, of course, opens communication between chambers 20 and 28 and between chambers 20 and 16. This centrifugal force will expel the sample S from chamber 28, through passageway 30, into the reagent chamber 20 and then outwardly through passageway 32 into chamber 16. This rapid flow of the sample S into the reagent chamber causes thorough intermixing of the sample with the reagent. Because chamber 16 is sealed to atmosphere, the air within the chamber will be compressed as the fluid is forced into chamber 16. Accordingly, when the centrifuge is stopped, the compressed air within chamber 16 will cause the intermixed fluids to return to chambers 20 and 28 in the manner illustrated in FIG. 6. Once again, any excess fluids will flow through slots 42 into the overflow chamber 44. Colorimetric assays may be conveniently taken at this time. In certain constructions, fluid flow also freely takes place between lower portion 26*b* of second container 26 and the inner walls of chamber 20 thereby further enhancing the mixing of the sample and the reagent.

Figure 7:
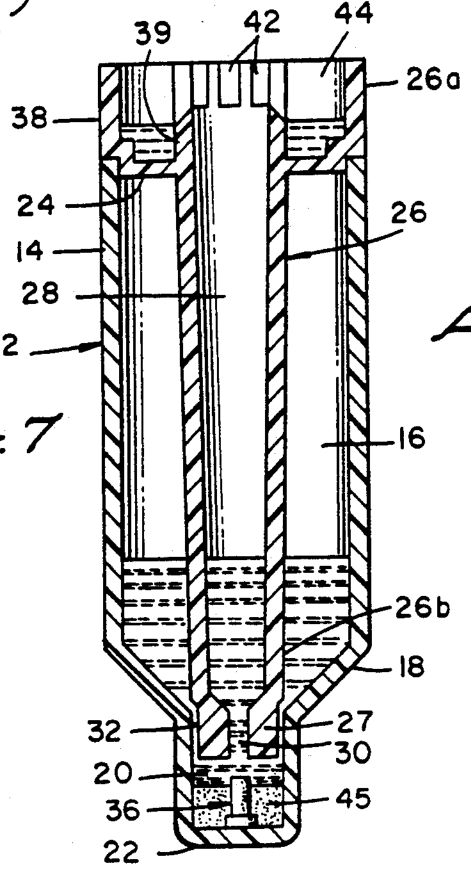
FIG. 7 is a cross-sectional view similar to FIG. 5 illustrating a final centrifuge step.
Figure 8:
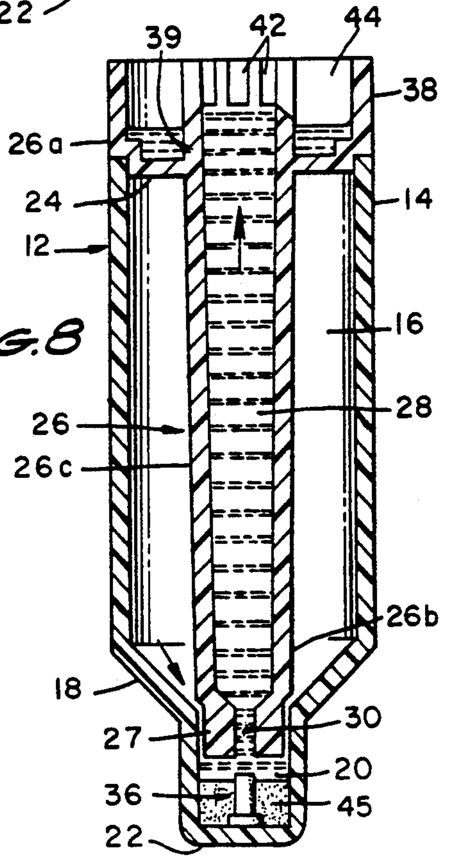
FIG. 8 is a cross-sectional view similar to FIG. 6 illustrating the collection of sedimentation of the precipitant at the bottom of the second chamber following the final centrifuge step.

In most sample preparations, adequate mixing can be achieved using a single centifugal cycle. This is achieved by minimizing the percentage of sample volume that remains in 30. If a second centrifuge step is required, this step is illustrated in FIG. 7 where it can be observed that gravitational forces exerted by the centrifuge will once again cause the intermixed fluids to flow through passageways 30 and 32 and into chamber 16. When the centrifuge is stopped, the compressed air within chamber 16 will again force the intermixed fluids to return to chambers 16 and 20. When the centrifuge is stopped this final time the precipitant free sample will return level with the slots 42 at the top of the sample chamber 28 and may be conveniently removed for measurement of HDL. The sediment designated in FIG. 8 by the numeral 45 remains within the bottom portion of chamber 20.

Turning now to FIGS. 9-14 of the drawings, an alternate embodiment of the invention is there illustrated. In this alternate form of the invention, the device comprises a first outer container 112 having upper generally cylindrically shaped outer walls 114 defining a first, or intermixing chamber 116. Container 112 includes tapering walls 118 which define a frustoconical section that interconnects upper or first chamber 116 with a second, or reagent chamber 120. A bottom wall 122 closes lower reagent chamber 120 and an upper wall 124, of a character presently to be described, closes upper chamber 116.

Figure 9:
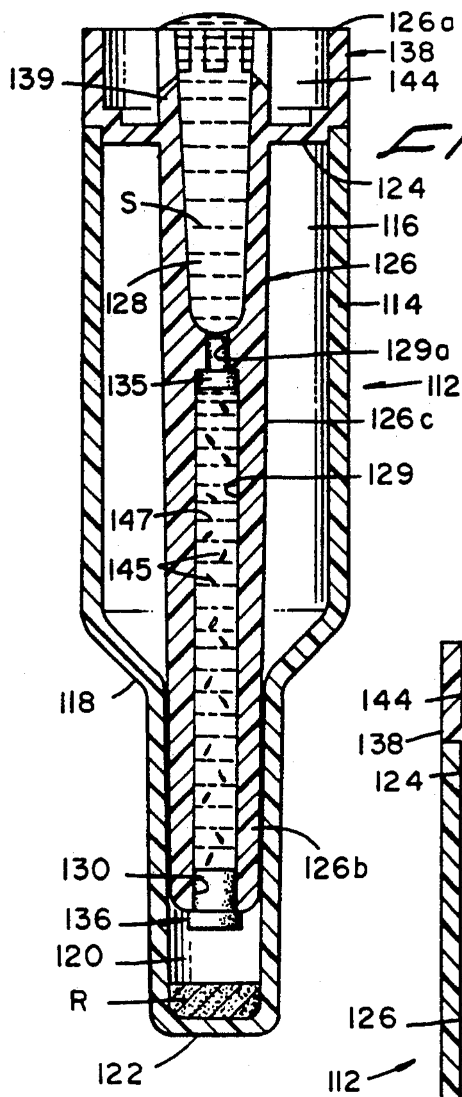
FIG. 9 is a cross-sectional view of an alternate form of sample preparation device of the present invention.

The device of this second form of the invention also includes a second container 126 which comprises a first or upper portion 126a, a second or lower portion 126b and an intermediate portion 126c. Second container 126 includes a first sample chamber 128 which is open at the upper end 126a. A second sample chamber 129 is disposed adjacent chamber 128 and is interconnected therewithin by a fluid passageway 129a. As indicated in FIG. 9, second portion 126b of second container 126 is sealably receivable within the upper portion of chamber 120 of the first container. When second container 126 is so positioned within the first container, an axial passageway 130 functions to permit fluid communication between second sample chamber 129 of the second container and lower or reagent chamber 120 of the first container. Preferably portion 126b of the second container is loosely received within the upper portion so as to permit fluid communication between chamber 129 and intermixing chamber 116 of first container 112 during centrifugation.

Figure 10:
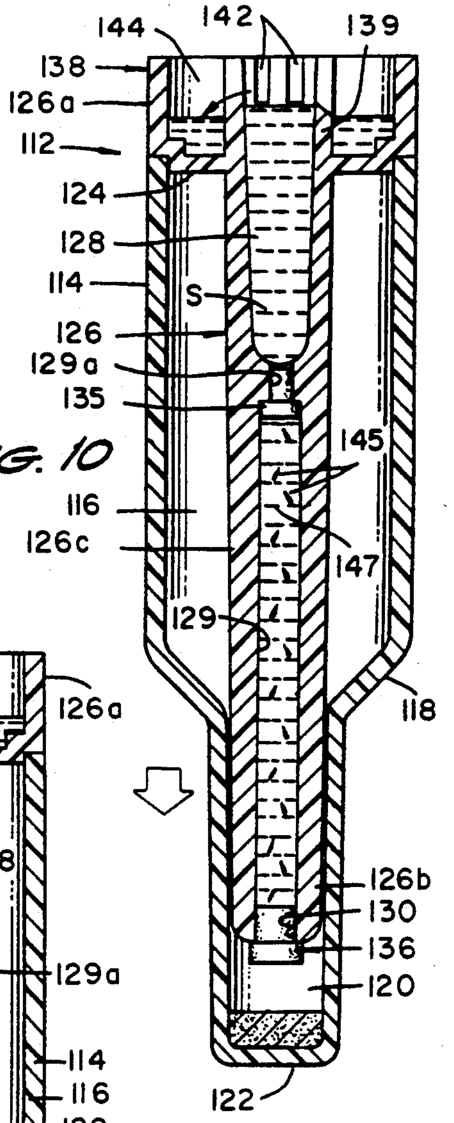
FIG. 10 is a cross-sectional view similar to FIG. 9 illustrating the initial overflow of the sample into the overflow chamber during the initial centrifuge period.
Figure 11:
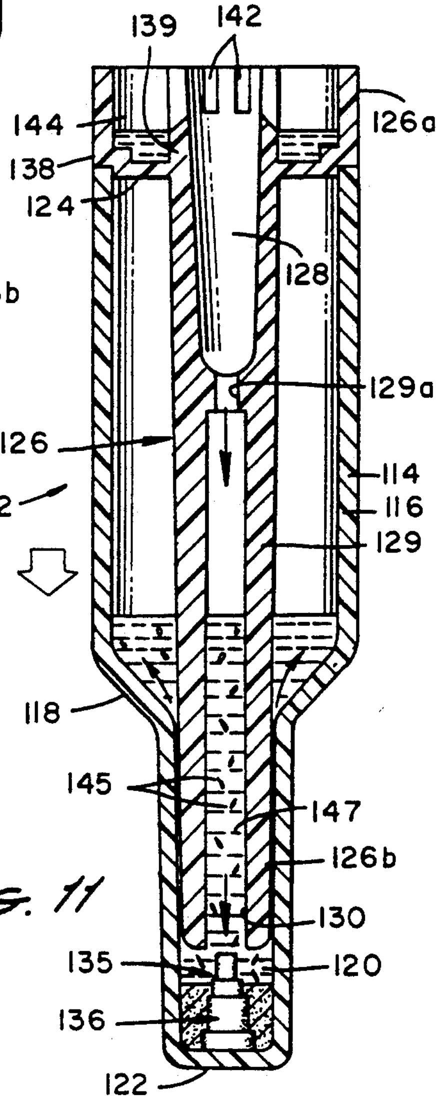
FIG. 11 is a cross-sectional view similar to FIG. 10 illustrating the flow of the fluids within the device during the performance of the second centrifuge period.
Figure 12:
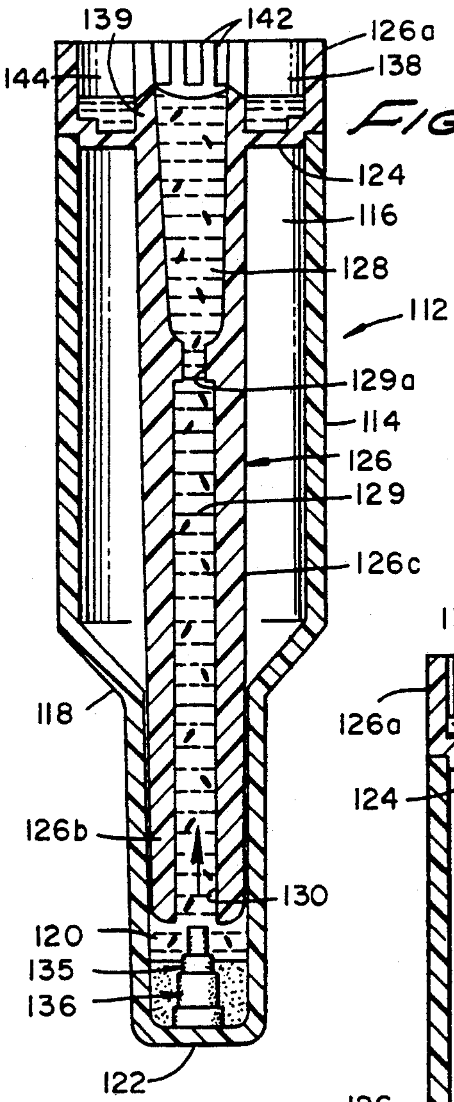
FIG. 12 is a cross-sectional view similar to FIG. 11 illustrating the flow of fluids back into the chambers of the device after the second centrifuge period has been completed.
Figure 13:
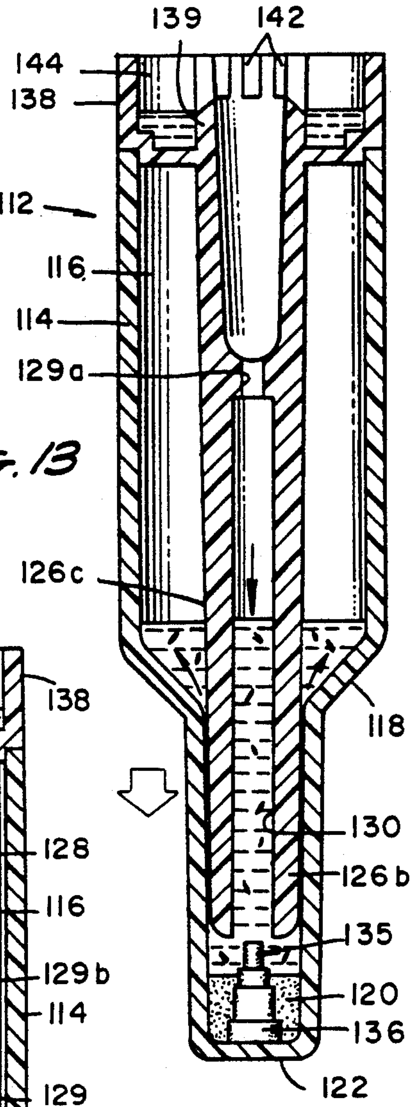
FIG. 13 is a cross-sectional view similar to FIG. 12 illustrating a further centrifuge period.
Figure 14:
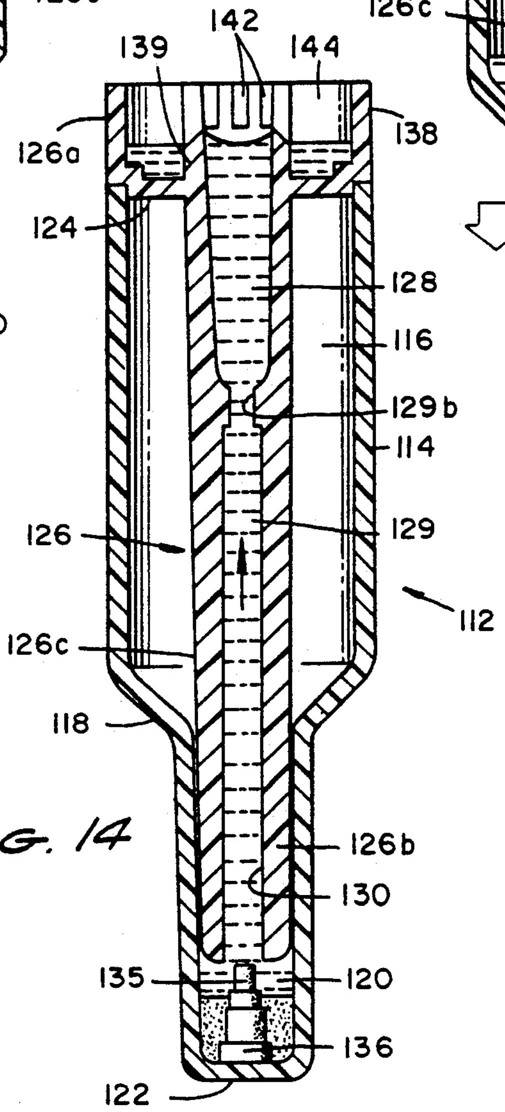
FIG. 14 is a cross-sectional view similar to FIG. 13 illustrating the collection of sedimentation of the percipient at the bottom of the lowest chamber of the device.

A first closure means or elastomeric plug 135 initially closes fluid passageway 129a and a second closure means or elastomeric plug 136 initially closes passageway 130. Both plugs 135 and 136 have a shank portion and an enlarged diameter head portion. The shank portion of plug 35 is closely receivable within passageway 129a and functions to block fluid communication between first and second chambers 128 and 129 of the second container. The shank portion of plug 136 is closely receivable within passageway 130 and functions to block fluid flow between second chamber 129 and lower chamber 120 of the first container.

upper portion 126a of second container 126 includes an enlarged diameter portion 138 which is generally cylindrical in shape and has outer walls which terminate in the previously mentioned partition wall 124 which functions to close the upper end of chamber 116. Enlarged diameter portion 138 circumscribes an upper generally cylindrically shaped portion 139 of second container 126. As best seen in FIGS. 10 and 11, portion 139 is provided with a plurality of circumferential spaced slots 142 which permit fluid communication between chamber 128 of container 126 and an overflow chamber 144 defined internally of cylindrical portion 138 of the second container 126.

Referring now to FIG. 9, chamber 120 of the device contains a precisely measured volume of a selected reagent R, which in this case is a soluble labeled antibody or antigen. With the sealing means or plug 136 in place as shown in FIG. 9, chamber 120 is effectively sealed from both chambers 129 and 116. In this form of the invention, chamber 129 is filled with styrene latex or other particles 145 suspended in a diluent buffer 147. Particles 145 are bound with an antibody. As before, chamber 128 is filled to overflowing with the selected sample S which is to be processed. As centrifugal force increases, some of the sample S will flow through slots 142 and into the overflow chamber 144 in the manner illustrated in FIG. 10. This results in a precise volumetric amount of the sample S remaining within chamber 128.

As the centrifuge is accelerated, the centrifugal force will continue to increase until a point is reached where both plugs 135 and 136 are forced out of sealing engagement with passageways 129 and 130 and into chamber 120 in the manner shown in FIG. 11. This, of course, opens communication between chambers 120 and 129 and between chambers 120 and 116. This centrifugal force will force the sample S from chamber 128, through passageway 129a, through chamber 129, into the reagent chamber 120 and then outwardly past the outer walls of portion 126b and into chamber 116. This rapid flow of the sample S into the reagent chamber causes thorough intermixing of the sample with particles 145 and the soluble antibody. Because chamber 116 is sealed to atmosphere, the air within the chamber will be compressed as the fluid is forced into chamber 116. Accordingly, when the centrifuge is stopped and the compressed air within chamber 116 will cause the intermixed fluids to return to chambers 120, 128 and 129 in the manner illustrated in FIG. 12. the soluble labeled antibody is bound to the solid phase in the presence of antigen during an incubation period.

If it is needed, the centrifuge can be started once more to sediment the particles which effectively separates the particles from the unbound labeled antibody. The amount of label remaining in the sample chamber (FIG. 14) is proportional to the amount of antigen present.

Referring to FIGS. 15–19 of the drawings, still another embodiment of the invention is there illustrated and generally designated by the numeral 250. This embodiment is similar in many respects to that shown in FIGS. 1–8 and comprises a first outer container 252 having upper generally cylindrically shaped outer walls 254 defining an upper chamber 256. Container 252 also includes cup-shaped walls 258 which define a lower chamber 260. A skirt portion 261 circumscribes lower chamber 260.

Figure 16:
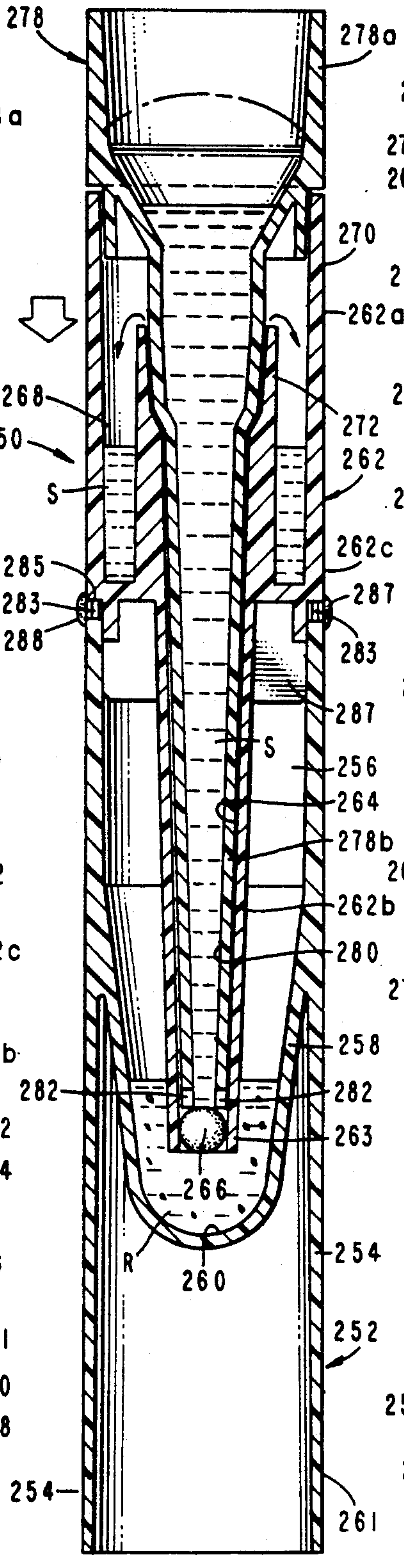
FIG. 16 is a side elevational, cross-sectional view of the assembled apparatus in a starting configuration.

The device of this form of the invention also includes a second container 262 which includes a first or upper portion 262a, a second or lower portion 262b and an intermediate portion 262c. Second container 262 includes an internal chamber 264 which is open at both its upper and lower ends. However, as is best seen in FIG. 16, the lower end 263 extends into chamber 260 and is initially closed by a sealing means, shown here as an elastomeric, generally spherically-shaped member 266.

Figure 15:
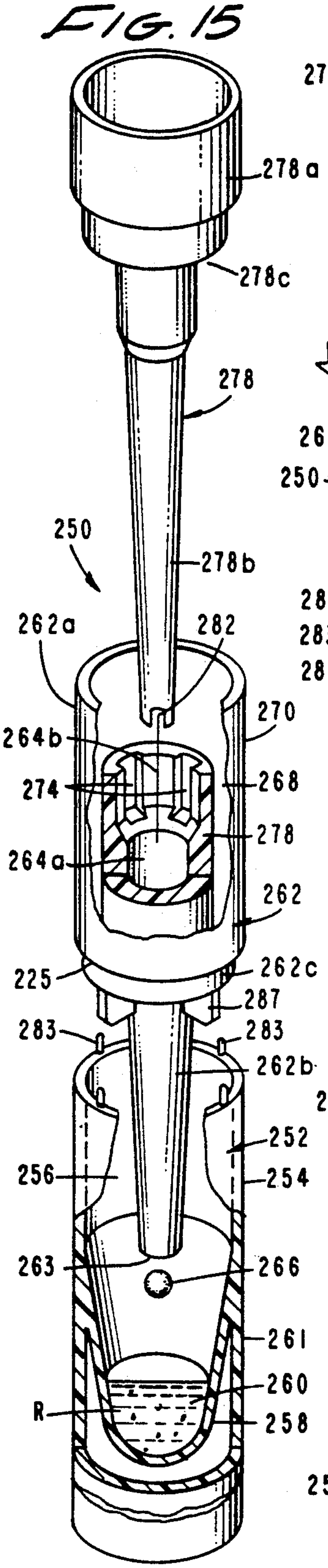
FIG. 15 is a generally perspective exploded view of the apparatus of another form of the apparatus of the invention.

At the upper portion 262 of the second container, there is provided an overflow chamber 268 which is disposed between an outer cylindrical wall 270 and an inner wall 272 which defines the upper portion 264a of chamber 264. Chamber 264 tapers inwardly and includes proximate its upper end an enlarged diameter portion 264b. As best seen in FIG. 15, circumferentially spaced flow passageways 274 are provided proximate the upper end of wall 272. (See also FIG. 19).

A third, funnel-like container 278 comprises an upper cylindrically shaped portion 278a, a lower tapered portion 278b and an intermediate portion 278c. A fluid passageway 280 extends through container 278. Turning to FIG. 16 it can be seen that lower portion 278b of container 278 is closely received within chamber 264 of second container 262 with intermediate portion 278c resting within the enlarged diameter portion 264b. Importantly, container 278 is dimensioned so that a slight clearance is provided between its outer wall and the inner wall of chamber 264 so as to permit fluid flow therebetween. As indicated in FIG. 15, circumferentially spaced notches 282 are provided proximate the open lower end of container 278 so that trapped air as well as fluid introduced into passageway 280 through the open top upper portion 278 of the third container can flow through notches 282, between the walls of the second and third containers, thence into overflow reservoir 268. With this construction, sample poured into funnel-like container 278 reaches the bottom of container 262 without any impedance which might result due to trapped air within passageway 282.

In using the apparatus of this latest form of the invention, a precisely measured volume of a selected reagent R is introduced into lower chamber 260 of first container 262. With plug 266 in placed within the lower end of 263 of container 262, the container is mated with first container 252 in the manner shown in FIG. 16 so that the intermediate portion 262*c* of container 262 is received within upper chamber 256 and a shoulder 285 rests upon spacer elements 283. Radially outwardly extending guide elements 287 function to center the second container relative to the first container. Spacer elements 283 function to create a small gap between shoulder 285 and the upper edge of container 262 so that a bonding agent or adhesive 287 can flow into the gap and after caring, sealably interconnect containers 252 and 262 to form sealed chamber 260. Containers 252 and 262 can also be bonded together by ultrasonic welding or by other similar processes well known to the art.

Following the bonding step, third container 278 is mated with second container 262 in the manner shown in FIG. 16. In the mated configuration, the lower end of the third container is disposed proximate sealing plug 266.

With the first, second and third containers mated in the stacked relationship shown in FIG. 16, the sample S is poured into the third container through open upper end 278*a*. As previously mentioned, any excess sample can flow outwardly through notches 282, between the walls of the second and third containers and into the reservoir 268. With this unique construction, trapped air can also be accommodated so as to not impede free fluid flow into passageway 280.

Figure 17:
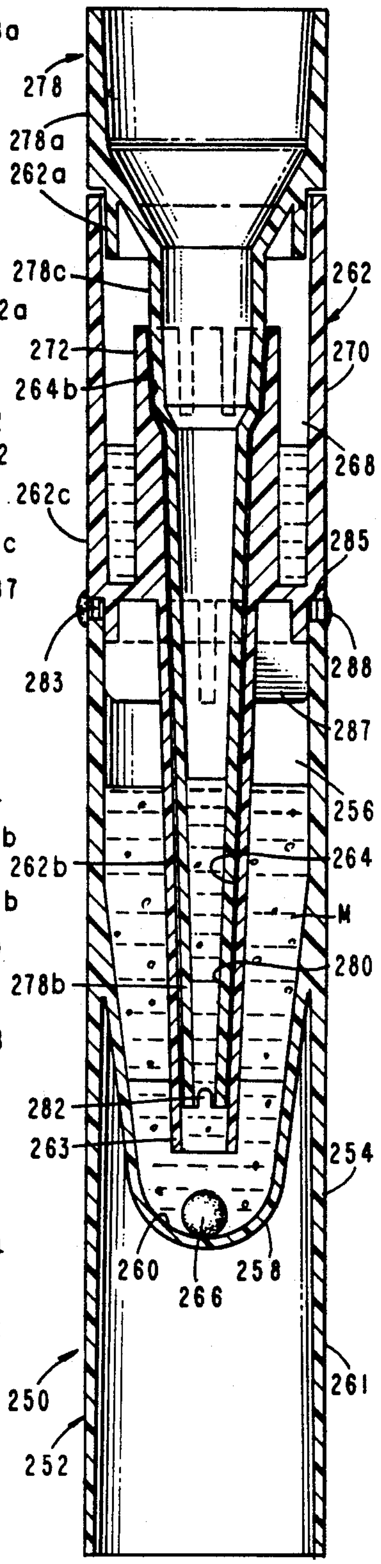
FIG. 17 is a side elevational, cross-sectional view similar to FIG. 16 but shown in a component mixing configuration.
Figure 18:
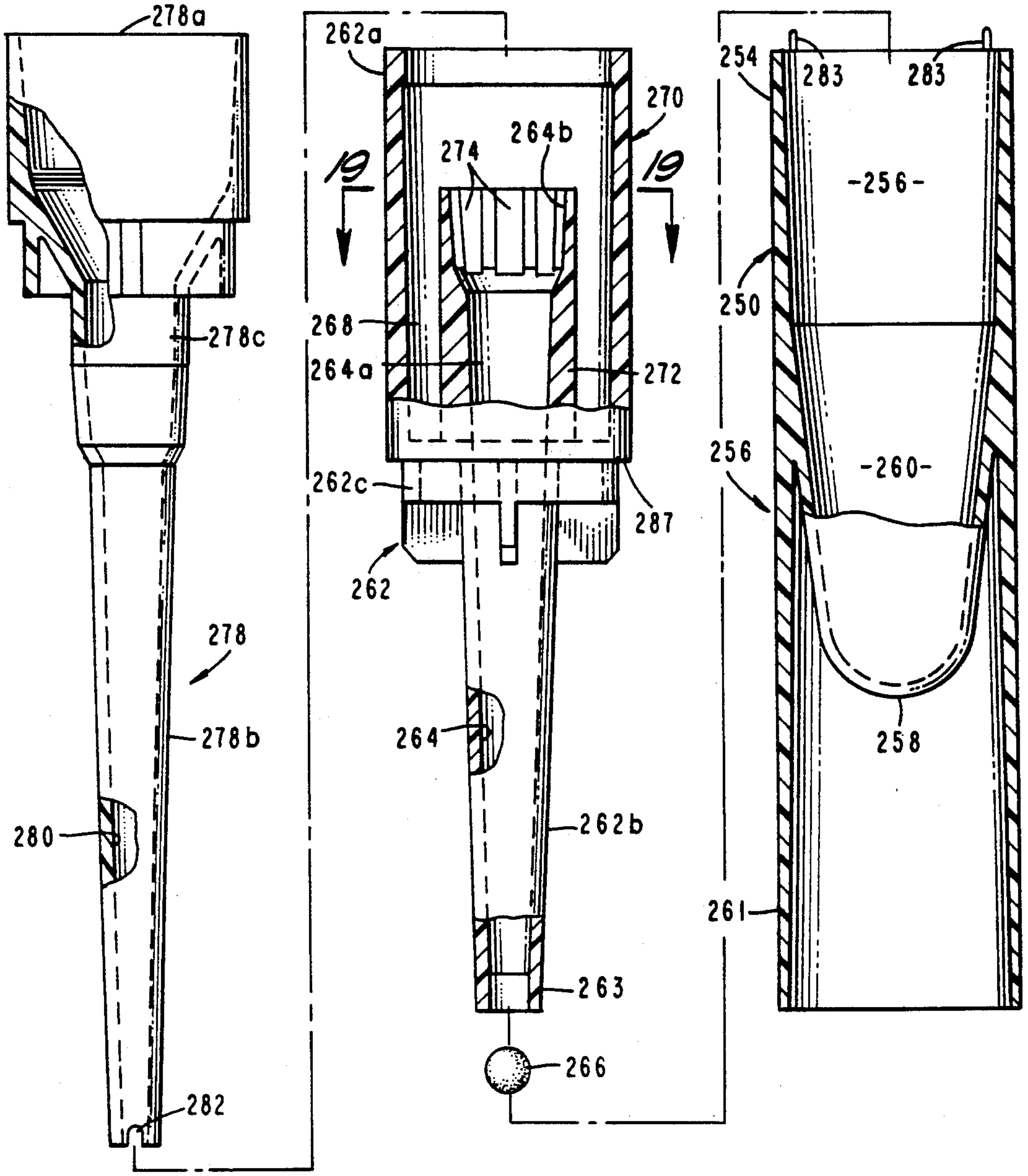
FIG. 18 is an exploded, side elevational view partly in section of the three component parts of the apparatus of the invention.
Figure 19:
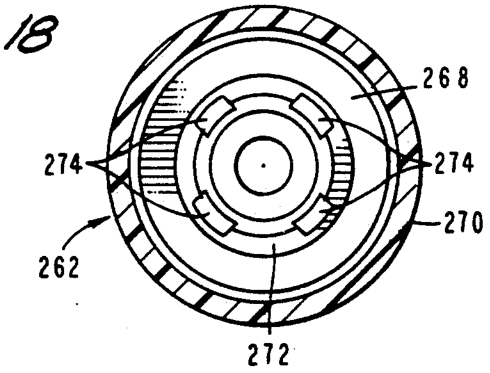
FIG. 19 is a cross-sectional view taken along lines 19—19 of FIG. 18.

The apparatus is next placed in a centrifuge and accelerated until the centrifugal forces reach a point sufficient to cause the sealing means or plug 266 to be forced out of sealing engagement with passageway 264 so that it falls into chamber 260 in the manner shown in FIG. 17. This, of course, opens communication between passageway 280 and chamber 260, and the built-up centrifugal forces will dynamically expel the precise volume of the sample S which remains in passageway 280 from third container 278 and into the reagent chamber 260. This rapid flow of the sample S into the reagent chamber causes thorough intermixing of the sample of precise volume with the reagent to form mixture M also depicted in FIG. 17.

As was also the case with the earlier described embodiments of the invention, the construction of the apparatus is such that a stored energy will be generated within the device by the centrifugal force used to centrifugate the apparatus. This stored energy accomplishes several things. For example, it will force the sealing means 266 from sealing engagement with the lower end 263 of container 262 and will then urge the fluid contained within passageway 260 into sealed chamber 260 with substantial force. Since chamber 260 is sealed this stored energy will be converted into compressed air energy as the air within the upper portions of chamber 260 is compressed by the fluid rushing into the chamber. The compressed air energy will then push the mixed fluid back into chamber 280 causing the fluid to reach a higher level than a equilibrium level. The fluid will then tend to seek equilibrium causing it to flow back into chamber 260. During this "back and forth" or "self-oscillating" motion, the fluids within the two containers become thoroughly mixed without the removal of the centrifugal force.

After the mixing step, the second and third containers can be separated from the first container and the mixture M removed therefrom.

Containers 252, 262 and 278 can be expeditiously and inexpensively constructed from a variety of materials such as moldable plastic and advantageously can normally be discarded after use.

Figure 20:
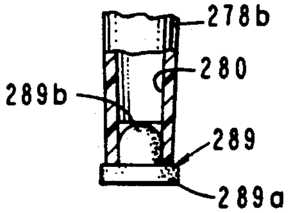
FIG. 20 is a fragmentary cross-sectional view showing an alternate form of stopper member.

Turning now to FIG. 20 another form of closure means is there shown. This closure means comprises a resilient plug 289 having a circular base 289*a* and an integral dome shaped portion 289*b* that is closely receivable within passageway 280.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. A sample preparation device for mixing a sample with a reagent, comprising:

(a) a first container having an upper and lower portions;

(b) a second container having upper and lower portions, said lower portion being disposed within said first container to form a substantially closed reagent chamber between said containers, an intermediate portion defining a wall sealing connecting the first and second containers, said second container having a passageway communicating with said reagent chamber below said wall;

(c) a third container having an open upper end portion and a lower portion, said lower portion being disposed within said second container and including a fluid passageway adapted to contain a sample of a precise volume and to selectively communicate with said reagent chamber; and (d) a closure means disposed in said passageway of said second container for closing said passageway, said closure means being removable from said passageway by centrifugal force to thereby open said passageway, whereby the sample contained within said passageway of said third container is permitted to mix with the reagent contained within the reagent chamber during centrifugation and the sample and reagent mixture is returned to the sample chamber as a result of air pressure in the reagent chamber.

2. A device as defined in claim 1 in which said closure means comprises a plug closely receivable within said passageway of said second container.

3. A device as defined in claim 1 in which said first and second containers are connected to form a sealed reagent chamber.

4. A device as defined in claim 1 in which said second container further includes an overflow chamber in communication with said fluid passageway of said third container.

5. A device as defined in claim 4 in which said overflow chamber is in fluid communication with said passageway of said third container via a clearance space located between said second and third containers.

6. A sample preparation device usable with a centrifuge for mixing a sample with a reagent comprising:

(a) a first container having an upper and a lower portions;

(b) a second container disposed within said first container to form a substantially sealed reagent chamber between said containers, an intermediate portion defining a wall sealingly connecting the first and second containers, said second container having a tapered wall defining a passageway communicating with said reagent chamber and including an overflow chamber in communication with said passageway;

(c) a third container having an open upper end portion and a lower end portion said lower portion having a wall closely receivable within said second container to define a clearance space providing fluid communication between said reagent chamber and said overflow chamber, said lower portion having an internal fluid passageway adapted to contain a precise volume of a sample and to selectively communicate with said reagent chamber; and (d) a closure means disposed in said passageway of said second container for closing said passageway, said closure means being removable from said passageway by centrifugal force thereby open said passageway, whereby the sample contained within said passageway of said third container is permitted to mix with the reagent in the reagent chamber during centrifugation and the sample and reagent mixture is returned to the sample chamber as a result of air pressure in the reagent chamber.

7. A device as defined in claim 6 in which said closure means comprises a plug closely receivable within said passageway of said second container.

8. A device as defined in claim 6 in which said plug is spherical in shape.

9. A device as defined in claim 6 in which said plug comprises a circular base portion and a dome shaped portion connected to said bas portion.

10. A device as defined in claim 6 in which second container further includes an upper wall connected to said tapered wall and a cylindrical wall connected to said upper wall, said overflow chamber being disposed between said upper wall and said cylindrical wall.

* * * * *